April 1, 1924.

W. F. SMITH

AIR PRESSURE GAUGE

Filed May 31, 1923

1,489,164

W. F. Smith, Inventor

By Ashton Lee

Attorneys

Patented Apr. 1, 1924.

1,489,164

UNITED STATES PATENT OFFICE.

WALTER F. SMITH, OF BOVEY, MINNESOTA, ASSIGNOR OF ONE-HALF TO FRANCIS J. COSTELLO, OF BOVEY, MINNESOTA.

AIR-PRESSURE GAUGE.

Application filed May 31, 1923. Serial No. 642,641.

*To all whom it may concern:*

Be it known that I, WALTER F. SMITH, a citizen of the United States, residing at Bovey, in the county of Itasca and State of Minnesota, have invented a new and useful Air-Pressure Gauge, of which the following is a specification.

This invention relates to air pressure gauges especially designed for use in connection with the valves of pneumatic tires or the like.

The primary object of the invention is to provide a gauge which may be readily and easily positioned on a tire valve, whereby the person using the gauge may determine at a glance the air pressure in the tire equipped with the device.

Another object of the invention is to provide a device of this character which may be permanently carried on the tire valve, novel means being provided to permit the tire to be inflated while the gauge is in position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
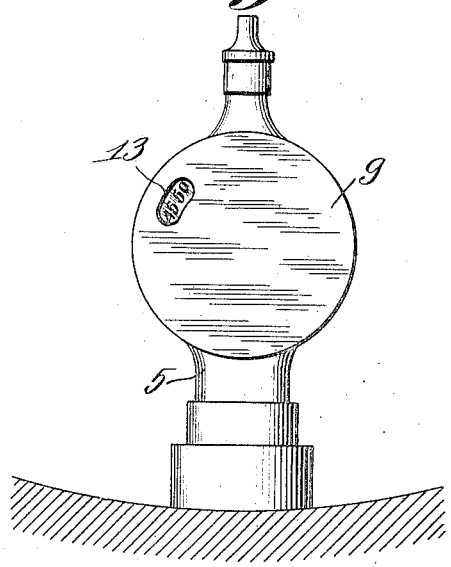
Figure 1 is a front elevational view of a gauge constructed in accordance with the invention.
Figure 2:
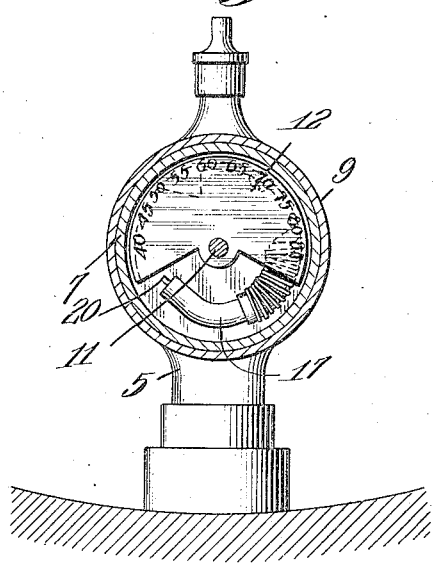
Figure 2 is an elevational view thereof, the cover being removed and the body portion of the gauge being shown in section.
Figure 3:
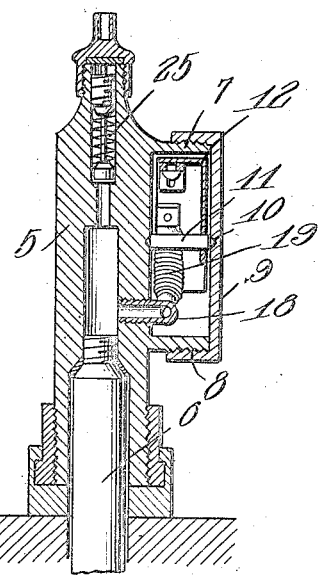
Figure 3 is a longitudinal sectional view through the gauge taken at right angles to Figure 2.
Figure 4:
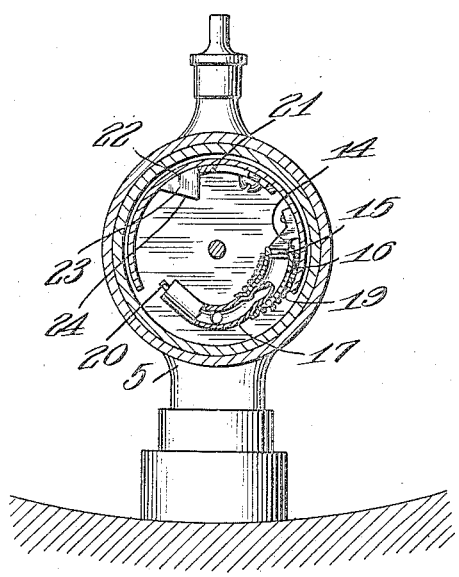
Figure 4 is a sectional view through the rear portion of the body the gauge.

Referring to the drawing in detail, the reference character 5 designates the body of the gauge which is formed with a longitudinal bore of a diameter to accommodate the usual valve stem of a penumatic tire, the valve stem being indicated at 6.

This body portion 5 is formed with a lateral annular flange 7 which is supplied with external threads designed to cooperate with the internal threads of the flange 8 forming a part of the cover 9. The cover 9 is formed with a recess 10 to receive one end of the shaft 11 on which the indicating section 12 is supported, the inner end of the shaft 11 being seated in a recess formed in the body 5. In order that the numbers supplied on the indicating member 12 may be readily and easily observed, an opening 13 is provided in the cover 9 and disposed directly opposite the numbers as clearly shown by Figure 1 of the drawing.

The wall of the indicating member is curved as clearly shown by Figure 1 of the drawing, so that the same may move in the arc of a circle within the body portion, there being provided an arm 14 secured to the movable member through which movement of an expansible member to be hereinafter more fully described, is imparted to the indicating member.

Formed in the arm 14 is a groove 15 to which one end of the flexible tube 16 is secured, the flexible tube having the opposite end thereof secured to the nozzle 17 which is in communication with the central bore of the body portion 5 through the pipe 18.

A coiled wire 19 surrounds the flexible tube 16 and prevents the air pressure within the tube from expanding the tube laterally thereby causing the tube to move longitudinally under the action of the air within the tube.

At the opposite end of the tube 17 is provided a valve 20 which valve is adapted to relieve the pressure in the body portion of the gauge when the air pressure in the tire has reached a predetermined degree. Carried by the indicating member 12 and adjustably supported thereby is an arm 21 that carries a lug 23 at one end thereof, which lug is formed with an inclined surface 24 adapted to engage the valve 20 when the indicating member moves to bring the lug 22 to a position to engage the valve, thereby unseating the valve and allowing the air to exhaust therethrough.

The upper extremity of the bore formed longitudinally of the body portion 5 is slightly restricted to accommodate the usual valve core 25 that permits of the attachment of a pump tube to the body portion when it is desired to inflate the tire supporting the device. From the foregoing it will be obvious that as the air enters the valve 6 and passes to the tube supporting the same, the air pressure in the tube causes the tube 16 to be elongated, with the result that the indicating member is gradually rotated to cause the numbers thereon to be displayed to the opening of the cover 9.

It is obvious that should the pressure in the tube become too great, the movement of the indicating member would force the lug 23 into engagement with the valve 20 to relieve the air pressure in the tube supporting the device.

I claim:—

1. In a pressure gauge, a body portion adapted for positioning on a valve stem, a housing on the body portion, said housing having a sight opening, a shaft supported within the housing, a curved indicating member provided with graduations on one surface thereof, mounted on the shaft to rotate within the housing, an expansible member having connection with the indicating member and adapted to receive air from the valve stem on which the device is supported, and means controlled by the movement of the indicating member for releasing excessive air pressure in the expansible member.

2. In a pressure gauge, a body portion adapted for positioning on a valve stem, a curved laterally extended flange formed on the body portion, a cover for the flange, providing a housing, a shaft positioned between the body portion and cover, a rotary indicating member on the shaft, an expansible member having connection with the indicating member and adapted to receive air from the body portion, a valve in one end of the expansible member and means carried by the indicating member and adapted to engage the valve in the expansible member to release air pressure in the expansible member.

In testimony that I claim the foregoing as my own, I have hereto affixed my signature in the presence of two witnesses.

WALTER F. SMITH.

Witnesses:
 FRANCIS J. COSTELLO,
 H. J. DOCKSTADER.